ized Patent [19] [11] 4,325,114
Kobayashi et al. [45] Apr. 13, 1982

United States Patent

[54] GATE CONTROLLING CIRCUIT FOR A THYRISTOR CONVERTER

[75] Inventors: Sumio Kobayashi, Yokohama; Tadashi Takahashi, Kawasaki; Hidetoshi Ino, Kunitachi, all of Japan

[73] Assignee: Tokyo Shibaura Denki Kabushiki Kaisha, Kawasaki, Japan

[21] Appl. No.: 131,661

[22] Filed: Mar. 19, 1980

[30] Foreign Application Priority Data

Apr. 24, 1979 [JP] Japan ................................. 54/50656

[51] Int. Cl.³ ...................... H02M 7/00; H03K 17/72
[52] U.S. Cl. .................................. 363/68; 307/252 L; 307/252 Q
[58] Field of Search ............ 307/252 K, 252 L, 252 Q; 363/57, 54, 68

[56] References Cited

U.S. PATENT DOCUMENTS

| 4,100,434 | 7/1978 | Iyotani et al. | 363/68 X |
| 4,223,236 | 9/1980 | Iyotani et al. | 363/68 X |
| 4,274,135 | 6/1981 | Rosa et al. | 363/68 |

FOREIGN PATENT DOCUMENTS 51-23302  7/1976  Japan .

Primary Examiner—William M. Shoop
Attorney, Agent, or Firm—Oblon, Fisher, Spivak, McClelland & Maier

[57] ABSTRACT

A gate controlling circuit for a thyristor converter having a forward/reverse bias voltage detecting circuit connected between the anode and the cathode of one of a plurality of serially connected thyristors in a thyristor arm of the converter for determining whether the thyristor is forward or reverse biased. The output of the forward/reverse bias voltage detector is utilized to control the gate control signals supplied to the thyristors in the thyristor arm.

6 Claims, 6 Drawing Figures

GATE CONTROLLING CIRCUIT FOR A THYRISTOR CONVERTER

BACKGROUND OF THE INVENTION

1. Field of the Invention

This invention relates in general to a gate controlling circuit for a thyristor converter having a plurality of thyristor arms.

2. Description of the Prior Art

Recently, there has been employed a narrow width pulse system wherein a gate pulse having a narrow width is supplied to each gate of a plurality of serially connected thyristors, i.e., thyristor arms therein, only at the time of firing of the thyristors.

However, in the case where one or more of the thyristors connected in series recovers to a reverse blocking state when most of the other thyristors are conductive, the rated voltage which is imposed across the sum of the thyristors will be applied to the recovered thyristors. Under such conditions, the recovered thyristors will be destroyed.

Of course, even if one or more of the thyristors are turned off, if the gate pulse is immediately supplied or generated, since the turned-off thyristors, i.e., recovered thyristors, can be turned on, the recovered thyristors will not be destroyed. However, in the prior art system one or more of the thyristors are selected from the thyristor arm at random to detect the forward and the reverse bias voltage across the thyristor arm. Therefore, if all of these randomly selected thyristors are in the conductive state it is impossible to detect the forward bias voltage of thyristor arm. As the result, the gate pulse is not produced.

If the voltages across the thyristors connected in series are each individually detected, the whole construction becomes prohibitively expensive. Additionally, such prior art detection systems have been costly to produce because the high voltages present in the thyristor arm necessitates the use of high voltage resistant parts in the detection circuit.

SUMMARY OF THE INVENTION

Accordingly, it is an object of this invention to provide a new and improved unique gate controlling circuit for a thyristor converter which does not expose one or more of a plurality of thyristors connected in series to danger such that destructive damage will not occur even if a thyristor is turned off when most of the other thyristors are conductive after a reverse voltage has been applied.

Briefly, these and other objects are achieved in accordance with one aspect of this invention by providing a gate control circuit for a thyristor converter having a plurality of thyristor arms, each being made up of a plurality of thyristors in series. The gate control circuit includes a first generator circuit for producing a gate pulse when a forward bias voltage is detected across one of the thyristors in one of the thyristor arms during a conductive period of the thyristor arm. A second generator circuit is provided for producing a gate pulse when a reverse bias voltage detected across the thyristor drops during a conductive period of the thyristor arm. The output of the second generator is inhibited when the period of the reverse bias voltage appearing across the thyristor during a conductive period exceeds a predetermined time period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
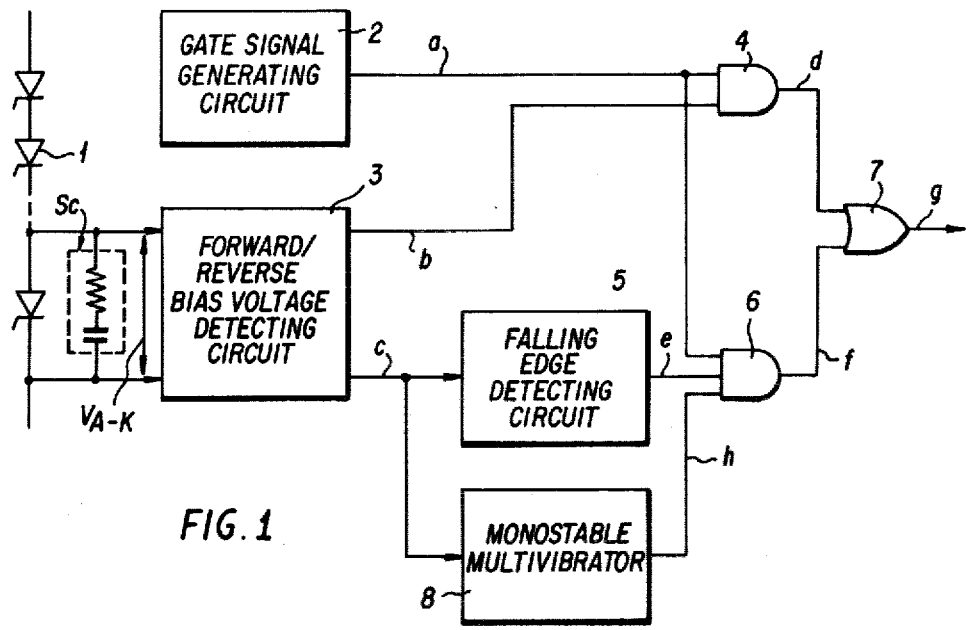
FIG. 1 is a block diagram of a preferred embodiment of this invention.

Referring now to the drawings, wherein like reference numerals or characters designate identical or corresponding parts throughout the several views, and more particularly to FIG. 1 thereof, wherein a thyristor valve or arm 1 is shown as including a plurality of controllable semiconductor switching elements, such as thyristors, connected in series and forming a part of thyristor converter. The thyristor arm 1 is controlled in a predetermined sequence in response to an output "a" of a reference circuit, such as a conventional gate signal generating circuit 2.

Figure 3:
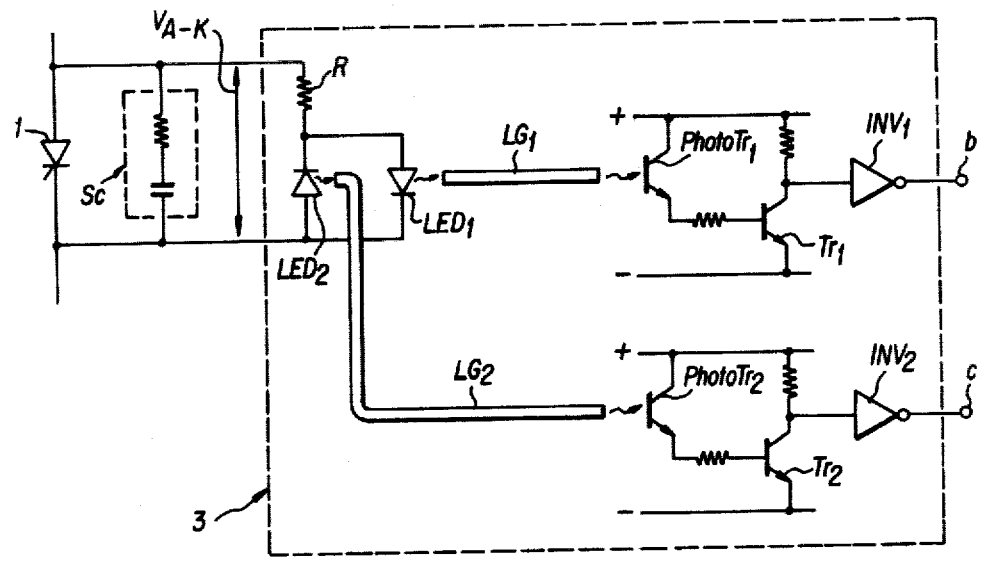
FIG. 3 is a schematic diagram of the forward/reverse bias voltage detecting circuit 3 shown in FIG. 1.

A forward/reverse bias voltage detecting circuit 3, hereinafter designated as the FRV detecting circuit, the details of which are shown in FIG. 3, is connected between the anode terminal and the cathode terminal of one or more of the thyristors of the thyristor arm 1 and is connected in parallel with a conventional snubber circuit, SC. The FRV detecting circuit 3 produces a forward bias voltage signal "b" which is detected when the voltage across the connected thyristor is at a forward bias voltage and produces a reverse bias voltage signal "c" which is detected when the voltage across the connected thyristor is at a reverse bias voltage.

The output "a" of the gate signal generating circuit 2 and the forward bias voltage signal "b" of the FRV detecting circuit 3 are supplied to a first generating means, i.e., a first AND gate 4, which produces a signal "d" when both signals "a" and "b" are at logic "1". The signal "d" indicates that a forward bias voltage is applied across the thyristors during the turn ON period of the output "a" of the gate signal generating circuit 2. The reverse bias voltage signal "c" of the FRV detecting circuit 3 is supplied to a falling edge detecting circuit 5 which produce a signal "e" when the signal "c" falls and to a monostable multivibrator circuit (one-shot multivibrator) 8 which produces a signal "h" having a width $T_1$.

The output "a", the signal "e" of the falling edge detecting circuit 5, and the signal "h" of the monostable multivibrator circuit 8 are supplied to a second generating means, i.e., a second AND gate 6, which produces a signal "f" when all the signals "a", "e" and "h" are at logic "1".

The output "d" of first AND gate 4 and the output "f" of second AND gate 6 are supplied to an adding means, i.e., an OR gate 7, which produces a signal "g" for driving the gates of the thyristor arm 1.

Figure 2:
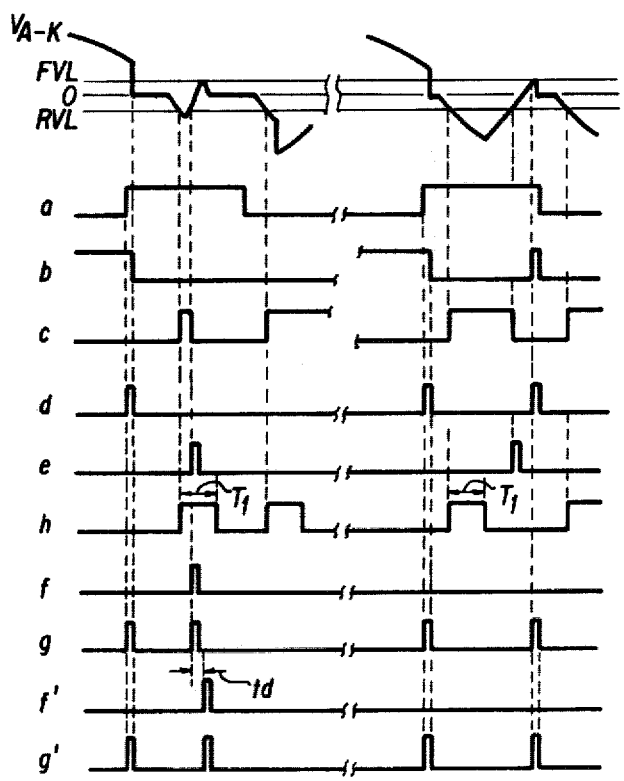
FIG. 2 is a timing chart showing waveforms of each of the components shown in FIG. 1.

In FIG. 2, it is noted that the waveform $V_{A-K}$ refers to the voltage between the anode and the cathode of the detected thyristor. FVL represents a forward voltage detecting level, and RVL represents a reverse voltage detecting level.

In general, the pulse width $T_1$ of the monostable multivibrator 8 is set equal or nearly equal to the turn-off time of a thyristor. Therefore, in the case where a reverse voltage is applied to the thyristor arm 1 during the turn ON period of the thyristor arm 1, due to characteristics of the external circuit, if the period of the reverse voltage is longer than the period $T_1$ of the monostable multivibrator circuit 8, since the output signal "f" of the second generating means, the second AND gate 6, is locked by the output signal "h", i.e., a logic "0" of the monostable multivibrator circuit 8, the output signal "f" for driving the gate of thyristor arm is not generated.

However, since each thyristor connected in series will recover to the forward direction blocking ability, when the forward voltage is applied to the thyristor arm 1, the FRV detecting circuit 3 produces a signal "b" such that the output signal "d" of first AND gate 4 is generated to make the thyristor arm 1 turn-on.

On the other hand, in the case when the period of the reverse voltage is shorter than the period $T_1$ of the monostable multivibrator circuit 8 during the turn ON period of the thyristor arm 1, since the output signal "f" of the AND gate 6 is not locked by the output signal "h" (a logic "1"), the gate signal "f" for driving the gate of the thyristor arm 1 is generated at the time when the output signal "e" becomes a logic "1", i.e., when the output signal "c" falls to a logic "0". In this case, since the rise of the forward bias voltage across the thyristor arm is rapid the narrow width pulse for driving the thyristor arm is sufficient.

Referring now to FIG. 3, the FRV detecting circuit 3, shown in FIG. 1, will be explained in detail. The FRV detecting circuit 3 includes the light emitting diodes $LED_1$ and $LED_2$ which are connected through a resistor R to the thyristor arm 1. Two signal receiving circuits are further provided, each having respective photo transistors Photo $Tr_1$ and $Tr_2$ and switching transistors $Tr_1$ and $Tr_2$ connected to the corresponding light emitting diodes $LED_1$ and $LED_2$ through respective light guides $LG_1$ and $LG_2$. The two signal receiving circuits serve to separate the low voltage stage, such as the controlling circuit, from the high voltage stage, such as the thyristor circuit.

When the voltage across the thyristor arm 1 is at a forward bias voltage, the $LED_1$ emits light whereby the signal "b" is produced and when the voltage across the thyristor arm 1 is at a reverse bias voltage, the $LED_2$ emits light whereby the signal "c" is produced.

Figure 4:
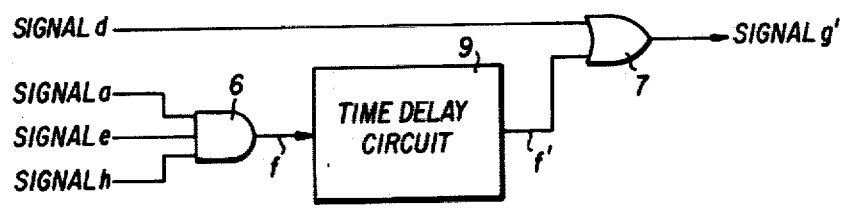
FIG. 4 illustrates a modification of the embodiment of this invention as shown in FIG. 1.

Referring now to FIG. 4, a modification of this invention is shown as having a time delay circuit 9 which is provided between the AND gate 6 and the OR gate 7. The time delay circuit 9 serves to protect the thyristor converter by delaying the time when it is possible to apply the gate signal to all of the thyristors by an amount td when the forward voltage is applied. The time delay circuit 9 also serves to reduce the width of the gate pulse for driving the gates of the thyristor arm 1 and consequently reduces the required capacity of the power supply (not shown) used for driving the gates. The signal "f" for driving the gates is delayed by a time td from the time when the signal "f" is generated. Consequently, the gate signal for the thyristors can be supplied to the gate terminals during a time when the forward voltage, which is necessary to fire or operate the thyristors, is applied between the anodes and cathodes of the thyristors.

In the case where the period of the reverse voltage during the turn ON period is longer than the period $T_1$, as seen on the right side of FIG. 2, even if the signal "e" of the falling edge detecting circuit 5 appears, no gate pulse signal "f" from the second AND gate 6 is generated. In this case, if the forward voltage appears after period $T_1$, the gate signal "d" from the first AND gate 4 is generated. On the other hand, in the case where the period of the reverse voltage during the turn-ON period is shorter than the period $T_1$, if the output signal "e" of the falling edge detecting circuit 5 appears within the period $T_1$, the gate signal "f" for driving the gate of the thyristor arm 1 is generated with a delayed time td.

Accordingly, in the case where the period of the reverse voltage is longer than the period $T_1$, the gate pulse is not produced within the period of the reverse voltage. Moreover, in the case where the period of the reverse voltage is short and the rise time of the recovery voltage of the thyristor is rapid, it is possible to set the time delay td to correspond to the recovery time of the thyristor and to reduce the width of the gate pulse for driving the gate.

Furthermore, in general it is necessary to set the width of the gate pulse "f" generated by the second AND gate 6 because the rise time of the recovery voltage of the thyristors to the forward direction is different in accordance with the period of the reverse voltage.

Figure 5A:
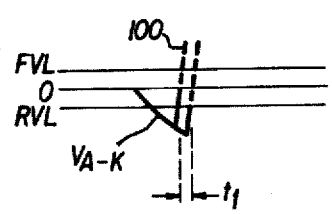
FIGS. 5A and 5B are waveforms illustrating the characteristics of the thyristor arm.
Figure 5B:
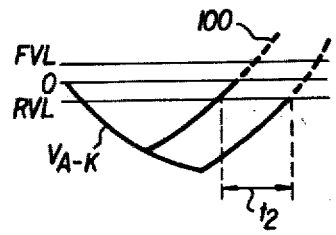

For example, FIG. 5A shows a voltage wave in which the rise time of the recovery voltage is rapid and FIG. 5B shows a voltage waveform in which the rise time of the recovery voltage is much slower. In FIG. 5A, since the period of the reverse voltage is short, i.e., the rise time of the recovery voltage is generally rapid, the time period $t_1$ based on the dispersion of the remaining carrier quantity Q of the thyristors connected in series is short. On the other hand, in FIG. 5B, since the period of the reverse voltage is long and the rise time of the recovery voltage is generally slow, the time $t_2$ is long.

Therefore, in the case where the voltage signal of the detected thyristor is detected as indicated by reference number 100 in FIGS. 5A and 5B, since it is necessary to set the width of the gate pulse generated by the second AND gate 6 to the time $t_2$ shown in FIG. 5B or more, the width of the gate pulse becomes longer that that shown in FIG. 5A. Therefore, it is necessary to provide an electric power source having a higher power capacity for the gate driver.

However, according to this invention, in the case where the rise time of the recovery voltage is rapid, the gate pulse from the second AND gate 6 is produced within the period $T_1$, and in the case when the rise time of the recovery voltage is delayed, the gate pulse is locked after the time period $T_1$ has passed.

It should now be apparent that in accordance with the teachings of this invention, it is possible to prevent exposing one or more of the thyristors to danger because even though a reverse bias voltage occurs across the thyristor arm after all of the thyristors are turned off, the gate signal is generated and supplied to all of the thyristors provided that the reverse voltage is detected within the predetermined period $T_1$ or provided that a forward voltage is detected.

Moreover, in accordance with this invention, by generating the gate pulse based on the reverse voltage signal detected during the turn-ON period, it is possible to safely operate the thyristor converter even if the forward voltage of the one or more of the thyristors to be detected can not be detected.

Furthermore, according to this invention, since the width of the gate pulse for driving the thyristor arm is limited, it is possible to reduce the capacity of the power source for driving the gates of the thyristor arm. As the result it is possible to provide an economical and safe gate controlling circuit for a thyristor converter used for direct current power transmission.

Obviously, numerous modifications and variations of this invention are possible in light of the above teachings. It is therefore to be understood that within the scope of the appended claims, the invention may be practiced otherwise than as specifically described herein.

What is claimed as new and desired to be secured by Letters Patent of the United States is:

1. A gate controlling circuit for a thyristor converter having a plurality of thyristor arms, each thyristor arm including a plurality of thyristors in series, said circuit comprising:
   first generating means for generating a gate pulse in response to a signal which is generated when a forward bias voltage is detected in one of said thyristor arms during a conductive period of the thyristor arm;
   second generating means for generating a gate pulse in response to an output which is generated when a reverse bias voltage detected in the thyristor arm drops during a conductive period of the thyristor arm; and
   means for inhibiting the output of the second generating means when the period of the reverse bias voltage in the thyristor arm exceeds a predetermined time period.

2. A gate controlling circuit as recited in claim 1, which further comprises:
   a gate signal generating circuit for commanding said thyristor arms in accordance with a predetermined sequence, said gate signal generating circuit being connected to said first and second generating means.

3. A gate controlling circuit as recited in claim 2, which further comprises:
   first detecting means for detecting a forward bias voltage across one of said thyristors in said thyristor arm, the output of said first detecting means being supplied to said first generating means;
   second detecting means for detecting a reverse bias voltage across said thyristor in said thyristor arm;
   falling edge detecting means for generating a signal when the output of said second detecting means drops, the output of said falling edge detecting means being supplied to said second generating means; and
   a monostable multivibrator circuit connected to the output of said second detecting means, said multivibrator generating a pulse upon detecting an output from said second detecting means, the output of said monostable multivibrating circuit being supplied to said second generating means.

4. A gate controlling circuit as recited in claim 1 which further comprises:
   means for adding the outputs of said first and said second generating means.

5. A gate controlling circuit for a thyristor converter having a plurality of thyristor arms, each thyristor arm including a plurality of thyristors in series, said circuit comprising:
   a gate signal generating circuit for commanding the gates of said thyristors in said thyristor arms in accordance with a predetermined sequence;
   first detecting means for detecting a forward bias voltage across one of said thyristors in one of said thyristor arms;
   second detecting means for detecting a reverse bias voltage across said thyristor in said thyristor arm;
   falling edge detecting means for generating a signal when the output of said second detecting means drops;
   a monostable multivibrator circuit connected to the output of said second detecting means, said multivibrator generating a pulse upon detecting an output from said second detecting means;
   first generating means for generating a gate pulse signal for the gates of said thyristor arm by a logical product of the output of said gate signal generating circuit and the output of said first detecting means;
   second generating means for generating a gate pulse signal for the gates of said thyristor arm by a logical product of the output of said gate signal generating circuit, the output of the third detecting means, and the output of the monostable multivibrating circuit; and
   means for adding the outputs of said first generating means and said second generating means.

6. A gate controlling circuit as recited in claim 5 which further comprises:
   time delay circuit means provided between the output of said second generating means and said adding means for delaying the output of said second generating means.

* * * * *